United States Patent
Morimoto et al.

(10) Patent No.: US 6,525,533 B2
(45) Date of Patent: Feb. 25, 2003

(54) CURRENT DETECTION SWITCH AND APPARATUS THEREWITH

(75) Inventors: Mitsuaki Morimoto, Shizuoka (JP); Takashi Gohara, Shizuoka (JP); Yoshinori Ikuta, Shizuoka (JP); Yasuhiro Tamai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/840,022

(22) Filed: Apr. 24, 2001

(65) Prior Publication Data

US 2001/0033471 A1 Oct. 25, 2001

(30) Foreign Application Priority Data

Apr. 24, 2000 (JP) .......... 2000-122908

(51) Int. Cl.[7] .......... G01R 33/00; H02H 3/00
(52) U.S. Cl. .......... 324/263; 361/93.1
(58) Field of Search .......... 324/117 R, 228, 324/232, 260, 263, 424; 361/93.1, 93.9, 102, 115, 63

(56) References Cited

U.S. PATENT DOCUMENTS

| | | | | |
|---|---|---|---|---|
| 5,132,608 A | * | 7/1992 | Nishifuji et al. .......... | 324/99 R |
| 5,475,301 A | * | 12/1995 | Kawakami et al. .......... | 324/117 R |
| 5,734,264 A | * | 3/1998 | Berna et al. .......... | 324/117 H |
| 6,252,389 B1 | * | 6/2001 | Baba et al. .......... | 324/117 H |
| 6,414,474 B1 | * | 7/2002 | Gohara et al. .......... | 324/117 H |

FOREIGN PATENT DOCUMENTS

| | | | |
|---|---|---|---|
| DE | 20 49 766 C3 | 4/1975 | |
| DE | 23 14 800 C2 | 7/1982 | |
| DE | 33 18 270 C1 | 8/1984 | |
| DE | 198 13 890 A1 | 9/1999 | |
| EP | 0 286 079 B1 | 2/1993 | |
| JP | 8-3499 | 1/1996 | .......... G01R/15/20 |

* cited by examiner

Primary Examiner—Matthew Nguyen
(74) Attorney, Agent, or Firm—Sughrue Mion, PLLC

(57) ABSTRACT

A current detection switch comprising a measured conductor into which a measured current flows, a plurality of magnetoelectric devices placed sandwiching the measured conductor so as to have magneto-sensitive faces on sides to which a magnetic flux generated by the measured current is input, each of the magnetoelectric devices for outputting a magnetoelectric signal when the magnetic flux exceeds a predetermined value, and a computation section for outputting a logical multiplication of the magnetoelectric signals from the plurality of magnetoelectric devices as a detection signal.

4 Claims, 5 Drawing Sheets

THRESHOLD VALUE OF CURRENT DETECTION SWITCH

CURRENT WAVEFORM OF MOTOR

FIG. 9

PRIOR ART

CURRENT DETECTION SWITCH AND APPARATUS THEREWITH

BACKGROUND OF THE INVENTION

1. Technical Field of the Invention

This invention relates to a current detection switch for detecting a current flowing into an electric circuit installed in a vehicle, a ship, an airplane, etc., and outputting the detection result and apparatus using the current detection switch.

2. Related Art

In recent years, vehicles each with a battery as a power source, such as electric automobiles and hybrid cars, have been becoming pervasive, and it has become important to manage charge and discharge of the battery. As a current detector used to manage charge and discharge of the battery, for example, a detector using a magnetoelectric device to detect a current flowing into an electric circuit is known. However, in this kind of current detector, the magnetoelectric device also reacts with a disturbance magnetic flux and thus precise current detection is difficult to execute; this is a problem.

Figure 9:
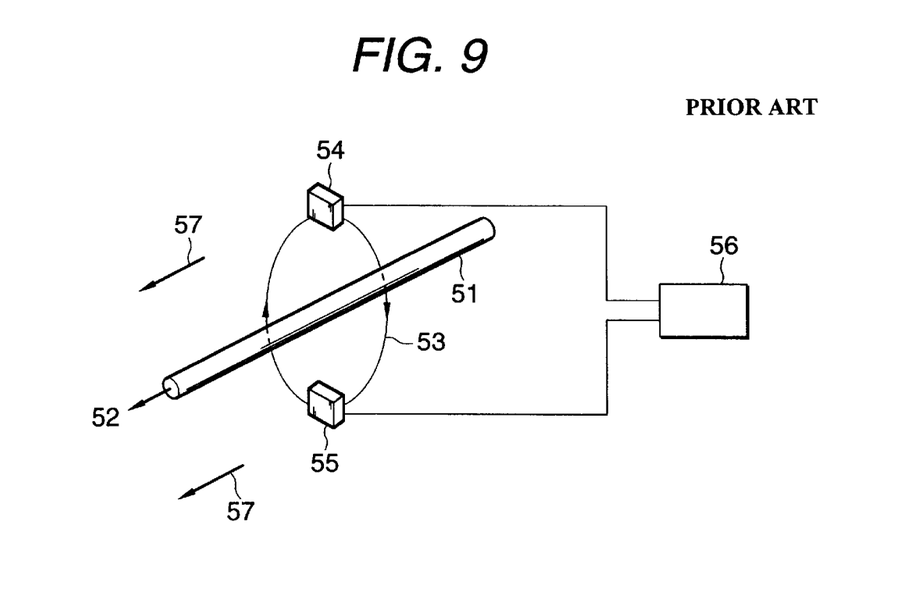
FIG. 9 is a drawing to describe a current detector in a related art.

To solve such a problem, for example, JP-A-63-253264 (JP-B-8-3499) discloses "current detector." The current detector comprises a conductor 51 for allowing a measured current 52 to flow, magnetoelectric devices 54 and 55 for converting a magnetic field occurring in the surroundings of the conductor 51 when the measured current 52 flows into the conductor 51 into electricity in the areas opposed to the surroundings of the conductor 51, and a combining section 56 for combining conversion outputs of the magnetoelectric devices 54 and 55, as shown in FIG. 9.

In the current detector, the magnetoelectric devices 54 and 55 have the same characteristic and receive magnetic fields of the same magnitude, different in direction with respect to a magnetic loop 53 occurring when the measured current 52 flows into the conductor 51. Thus, outputs from the magnetoelectric devices 54 and 55 are in opposite phase and if the outputs are differentially combined in the combining section 56, output of the combining section 56 becomes approximately twice output of the single magnetoelectric device. Consequently, the sensitivity of the current detector can be approximately doubled. on the other hand, when an external magnetic field 57 affects the whole current detector, the outputs from the magnetoelectric devices 54 and 55 are in phase with respect to the external magnetic field 57. Therefore, if the outputs are differentially combined in the combining section 56, output signals based on of the external magnetic field 57 are canceled out. Consequently, the effect of the disturbance magnetic field is excluded.

However, with the current detector disclosed in JP-A-63-253264 (JP-B-8-3499), if the disturbance magnetic fluxes input to the two magnetoelectric devices 54 and 55 do not have the same magnitude, the disturbance magnetic fluxes are not canceled out. A situation in which the disturbance magnetic fluxes input to the two magnetoelectric devices 54 and 55 differ in magnitude can occur depending on the positional relationship between the current detector and the magnetic flux generation source and if the situation occurs, the current detector cannot detect a current normally.

SUMMARY OF THE INVENTION

It is therefore an object of the invention to provide a current detection switch capable of detecting a current flowing into a measured conductor and outputting a detection signal without being affected by a disturbance magnetic flux and apparatus using the current detection switch.

To achieve the above problem, according to a first aspect of the invention, there is provided a current detection switch comprising:

a measured conductor into which a measured current flows;

a plurality of magnetoelectric devices placed sandwiching the measured conductor so as to have magnetosensitive faces on sides to which a magnetic flux generated by the measured current is input, each of the magnetoelectric devices for outputting a magnetoelectric signal when the magnetic flux exceeds a predetermined value; and a computation section for outputting a logical multiplication of the magnetoelectric signals from the plurality of magnetoelectric devices as a detection signal.

According to the first aspect of the invention, when no disturbance magnetic flux exists, every magnetoelectric device outputs a magnetoelectric signal when the magnetic flux generated by the measured current flowing into the measured conductor exceeds the predetermined value, whereby the computation section outputs a detection signal. In contrast, when disturbance magnetic flux exists, each magnetoelectric device outputs a magnetoelectric signal when the arithmetic sum of the magnetic flux generated by the measured current flowing into the measured conductor and the disturbance magnetic flux (the sum considering the direction of the disturbance magnetic flux) exceeds the predetermined value.

That is, the magnetoelectric device with the disturbance magnetic flux added to the magnetic flux generated by the measured current flowing into the measured conductor outputs a magnetoelectric signal if the current value is smaller than the predetermined threshold value, but the magnetoelectric device with the magnetic flux canceled out by the disturbance magnetic flux does not output a magnetoelectric signal unless the current value is larger than the predetermined threshold value. Consequently, the computation section outputs a detection signal when a larger current than the predetermined threshold value flows. In other words, when the measured current is equal to or less than a certain value, the current detection switch does not react with the disturbance magnetic flux and thus can detect the current flowing into the measured conductor without being affected by the disturbance magnetic flux.

According to a second aspect of the invention, in the current detection switch of the first aspect, the computation section outputs the logical multiplication of the magnetoelectric signals from the plurality of magnetoelectric devices and an abnormal signal from an outside when a vehicle is abnormal as the detection signal.

According to the second aspect of the invention, the computation section outputs the logical multiplication of the magnetoelectric signals from the plurality of magnetoelectric devices and an abnormal signal from an outside when a vehicle is abnormal as the detection signal, so that a detector such as a current detection switch, for example, when a circuit is dead-shorted because of a shock at the accident time and an abnormal current occurs can be configured.

According to a third aspect of the invention, there is provided a circuit breaking apparatus comprising:

a current detection switch including, a measured conductor into which a measured current flows, a plurality of magnetoelectric devices placed sandwiching the measured conductor so as to have magnetosensitive faces on sides to which a magnetic flux generated by the measured current flowing into the measured conductor is input, each of the magnetoelectric devices for outputting a magnetoelectric signal when the magnetic flux exceeds a predetermined value, and a computation section for outputting a logical multiplication of the magnetoelectric signals from the plurality of magnetoelectric devices as a detection signal.

a circuit breaker for shutting off the current flowing into the measured conductor; and a break drive section for causing the circuit breaker to shut off the current flowing into the measured conductor in response to the detection signal from the current detection switch.

According to the third aspect of the invention, the circuit breaking apparatus is configured using a current detection switch for detecting a current flowing into a measured conductor and outputting a detection signal without being affected by disturbance magnetic flux, and thus can shut off a circuit reliably regardless of the presence or absence of disturbance magnetic flux.

According to a fourth aspect of the invention, there is provided a load failure detecting apparatus comprising:

a current detection switch including, a measured conductor into which a measured current flows, the measured conductor being connecting a power supply to a load, a plurality of magnetoelectric devices placed sandwiching the measured conductor so as to have magnetosensitive faces on sides to which a magnetic flux generated by the measured current flowing into the measured conductor is input, each of the magnetoelectric devices for outputting a magnetoelectric signal when the magnetic flux exceeds a predetermined value, and a computation section for outputting a logical multiplication of the magnetoelectric signals from the plurality of magnetoelectric devices as a detection signal;

a load switch for supplying a current from the power supply to the load; and a warning device for generating a warning when the detection signal is not output from the current detection switch with the load switch turned on.

According to the fourth aspect of the invention, the load failure sensing apparatus is configured using a current detection switch for detecting a current flowing into a measured conductor and outputting a detection signal without being affected by disturbance magnetic flux and thus can notify a load failure and a broken conductor regardless of the presence or absence of disturbance magnetic flux.

DESCRIPTION OF PREFERRED EMBODIMENT

Referring now to the accompanying drawing, a current detection switch and apparatus using the current detection switch according to embodiments of the invention will be discussed in detail. In the description to follow, for simplicity, the current detection switch uses two magnetoelectric devices, but the number of magnetoelectric devices used with the current detection switch of the invention is not limited two and may be any number of more than two.

First embodiment

Figure 1A:
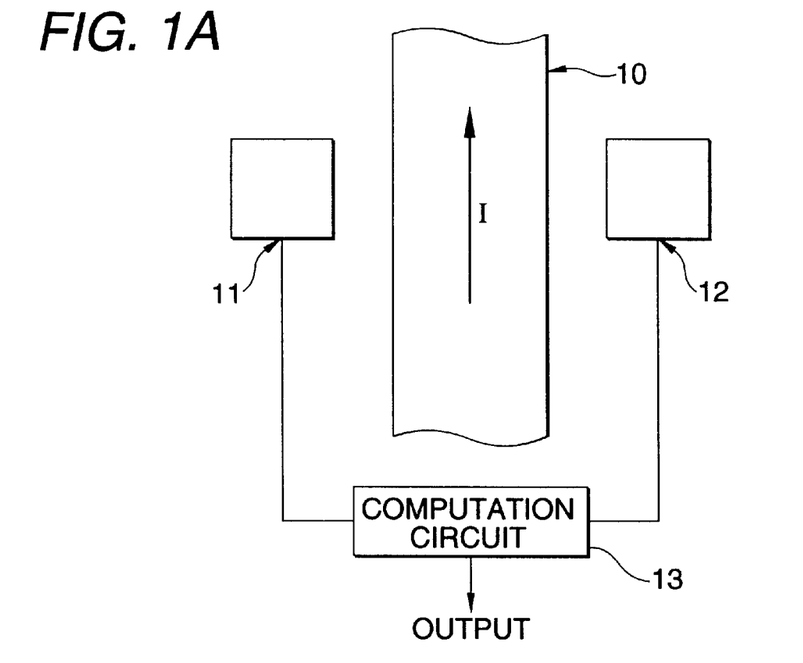
FIGS. 1A and 1B are drawings to show the configuration of a current detection switch according to a first embodiment of the invention.

FIG. 1 is a perspective view to show the configuration of a current detection switch according to a first embodiment of the invention. The current detection switch comprises a measured conductor 10, a first magnetoelectric device 11, a second magnetoelectric device 12, and a computation circuit 13. The components usually are housed in an electric connection box (not shown).

The measured conductor 10 is a conductor through which a measured current I flows. The first magnetoelectric device 11 and the second magnetoelectric device 12 are placed so as to sandwich the measured conductor 10 therebetween. More particularly, the first magnetoelectric device 11 and the second magnetoelectric device 12 are placed on a circle with the core of the measured conductor 10 as the center.

Figure 1B:
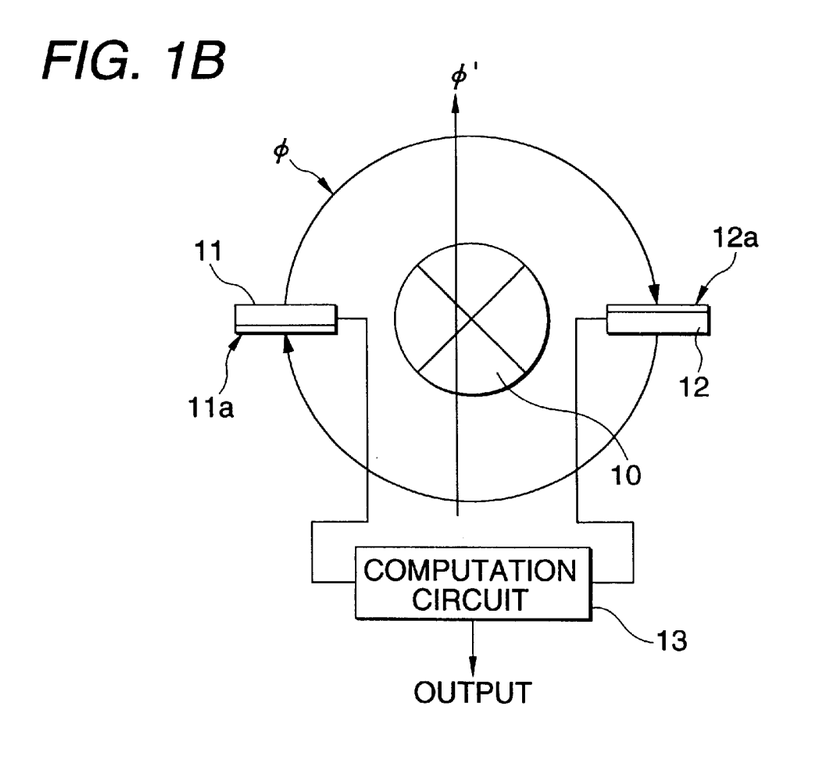

As shown in FIG. 1B, the placement directions of the first magnetoelectric device 11 and the second magnetoelectric device 12 are determined so that a magnetosensitive face 11a of the first magnetoelectric device 11 and a magnetosensitive face 12a of the second magnetoelectric device 12 are placed on the sides on which a magnetic flux φ generated by the measured current I flowing through the measured conductor 10 is made incident, and are aligned so that the magnetic flux φ is made incident in a direction perpendicular to each magnetosensitive face.

Hall devices, magnetoresistance elements, etc., can be used as the first magnetoelectric device 11 and the second magnetoelectric device 12. As shown in an output characteristic drawing of FIG. 2, when input magnetic flux φ is equal to or less than a threshold value φth, the first magnetoelectric device 11 outputs a low signal; when input magnetic flux φ is larger than the threshold value φth, the first magnetoelectric device 11 outputs a high signal. The second magnetoelectric device 12 has the same output characteristic as the first magnetoelectric device 11.

Figure 2:
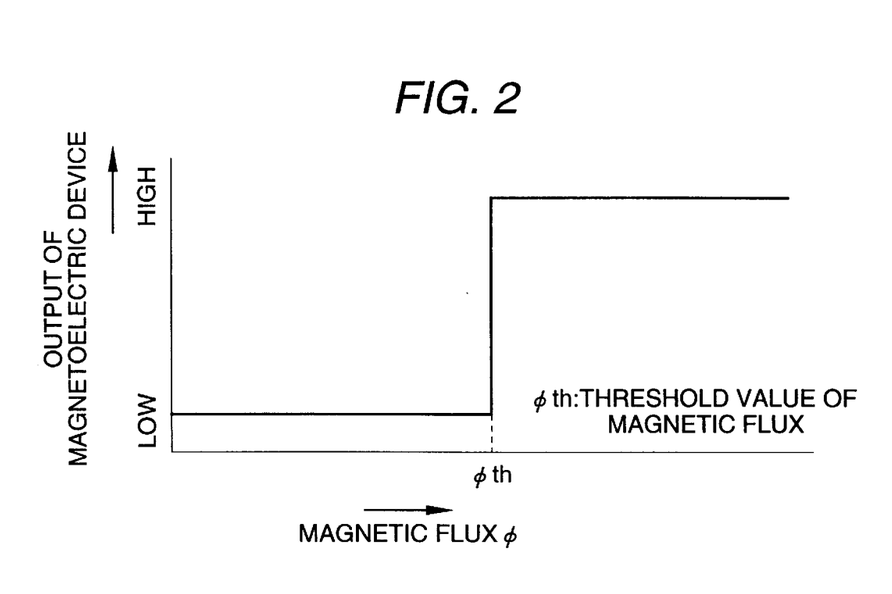
FIG. 2 is a drawing to describe the output characteristic of each magnetoelectric device used with the current detection switch according to the first embodiment of the invention.

The first magnetoelectric device 11 can be made up of a normal magnetoelectric device for outputting a signal of a magnitude proportional to the magnitude of the input magnetic flux $\phi$ and a comparator. That is, a signal from the magnetoelectric device is supplied to one input terminal of the comparator and a predetermined-level signal is supplied to the other input terminal of the comparator. Accordingly, when the signal from the magnetoelectric device is equal to or less than the predetermined level, the comparator outputs a low signal; when the signal is larger than the predetermined level, the-comparator outputs a high signal.

Figure 3:
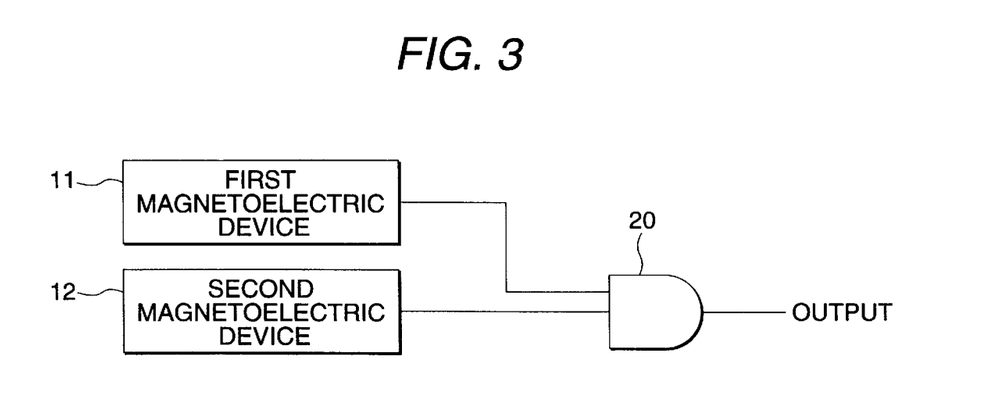
FIG. 3 is a specific circuit diagram of a computation circuit used with the current detection switch according to the first embodiment of the invention.

The computation circuit 13 corresponds to a computation section of the invention. The computation circuit 13 is constructed by a two-input AND gate 20 to which a signal from the first magnetoelectric device 11 and a signal from the second magnetoelectric device 12 are input, as shown in FIG. 3. The AND gate 20 outputs a logical multiplication of the signal from the first magnetoelectric device 11 and the signal from the second magnetoelectric device 12 as a detection signal of the current detection switch to the outside.

The operation of the described current detection switch according to the first embodiment of the invention is as follows:

When the measured current I flows into the measured conductor 10, magnetic flux $\phi$ is generated by the magnetic field of the strength corresponding to the magnitude of the measured current I in accordance with the corkscrew rule of ampere, as shown in FIG. 1B. The magnetic flux $\phi$ enters perpendicularly the magnetosensitive face 11a of the first magnetoelectric device 11 and the magnetosensitive face 12a of the second magnetoelectric device 12. Accordingly, the first magnetoelectric device 11 and the second magnetoelectric device 12 generate voltage signals corresponding to the density of the magnetic flux $\phi$.

In the described state, if no disturbance magnetic flux exists, the first magnetoelectric device 11 and the second magnetoelectric device 12 output each a low signal if the magnetic flux $\phi$ generated by the measured current I flowing into the measured conductor 10 is equal to or less than the threshold value $\phi$th; a high signal (magnetoelectric signal) if the magnetic flux $\phi$ exceeds the threshold value $\phi$th. The AND gate 20 outputs the logical multiplication of the signal from the first magnetoelectric device 11 and the signal from the second magnetoelectric device 12 as a detection signal of the current detection switch to the outside.

Therefore, if the measured current I flowing into the measured conductor 10 is equal to or less than a predetermined value, the AND gate 20 outputs a low signal; if the measured current I is larger than the predetermined value, the AND gate 20 outputs a high signal (detection signal).

On the other hand, if disturbance magnetic flux $\phi$' exists in the described state, each of the first magnetoelectric device 11 and the second magnetoelectric device 12 outputs a magnetoelectric signal when the arithmetic sum of the magnetic flux $\phi$ generated by the measured current I flowing into the measured conductor 10 and the disturbance magnetic flux $\phi$' (the sum considering the direction of the disturbance magnetic flux $\phi$') exceeds the threshold value $\phi$th.

When the disturbance magnetic flux $\phi$' as shown in FIG. 1B exists, the first magnetoelectric device 11 outputs a low signal if the magnetic flux $\phi$ generated by the measured current I flowing into the measured conductor 10 plus the disturbance magnetic flux $\phi$', namely, magnetic flux $\phi+\phi$' is equal to or less than the threshold value $\phi$th; the first magnetoelectric device 11 outputs a high signal (magnetoelectric signal) if the magnetic flux $\phi+\phi$' exceeds the threshold value $\phi$th.

The second magnetoelectric device 12 outputs a low signal if the magnetic flux $\phi$ generated by the measured current I flowing into the measured conductor 10 minus the disturbance magnetic flux $\phi$', namely, magnetic flux $\phi-\phi$' is equal to or less than the threshold value $\phi$th; the second magnetoelectric device 11 outputs a high signal (magnetoelectric signal) if the magnetic flux $\phi-\phi$' exceeds the threshold value $\phi$th.

The AND gate 20 outputs the logical multiplication of the signal from the first magnetoelectric device 11 and the signal from the second magnetoelectric device 12 as the detection signal of the current detection switch to the outside. Therefore, when the measured current I flows when the disturbance magnetic flux $\phi$' exists, the first magnetoelectric device 11 and the second magnetoelectric device 12 output each a low signal if the measured current I is equal to or less than a first value V1. Thus, the AND gate 20 outputs a low signal.

If the measured current I is larger than the first value V1 and is equal to or less than a second value V2 (V2>V1), the first magnetoelectric device 11 outputs a high signal and the second magnetoelectric device 12 outputs a low signal. Thus, the AND gate 20 outputs a low signal.

If the measured current I is larger than the second value V2, the first magnetoelectric device 11 and the second magnetoelectric device 12 output each a high signal. Thus, the AND gate 20 outputs a high signal.

After all, the AND gate 20 outputs a high signal, namely, a detection signal when the measured current I is larger than the second value V2. In other words, when the measured current I is equal to or less than the second value V2, the current detection switch does not react with the disturbance magnetic flux $\phi$' and thus can detect the measured current I flowing into the measured conductor 10 without being affected by the disturbance magnetic flux $\phi$'.

Since the current detection switch does not use a focusing magnet core, the volume and weight of the current detection switch can be lessened as compared with those of a core-type current detector, and costs can be decreased.

Figure 4:
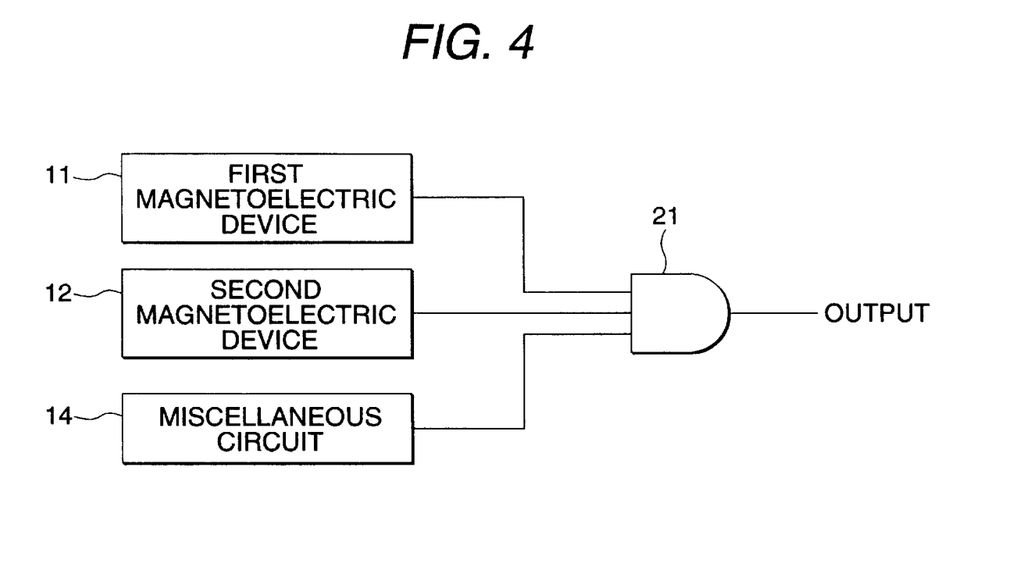
FIG. 4 is a circuit diagram of a modified example of the computation circuit used with the current detection switch according to the first embodiment of the invention.

In the described current detection switch according to the first embodiment of the invention, the computation circuit 13 is implemented as the two-input AND gate 20. However, as shown in FIG. 4, it can also be implemented as a three-input AND gate 21 to which a signal from a miscellaneous circuit 14 as well signals from the first magnetoelectric device 11 and the second magnetoelectric device 12 are input.

If an actuation detection circuit of an air bag is used, for example, as the miscellaneous circuit 14, a current occurring when the air bag is actuated can be detected without being affected by the disturbance magnetic flux.

Therefore, a current detection switch can be configured for detecting a current when an electric circuit is shorted and an abnormal current occurs as an accident in which the air bag is actuated, for example, occurs. In addition to the actuation detection circuit of an air bag, various circuits to be actuated under any desired condition can be used as the miscellaneous circuit 14.

Second embodiment

A second embodiment of the invention relates to a circuit breaking apparatus using the above-described current detection switch according to the first embodiment of the invention.

Figure 5:
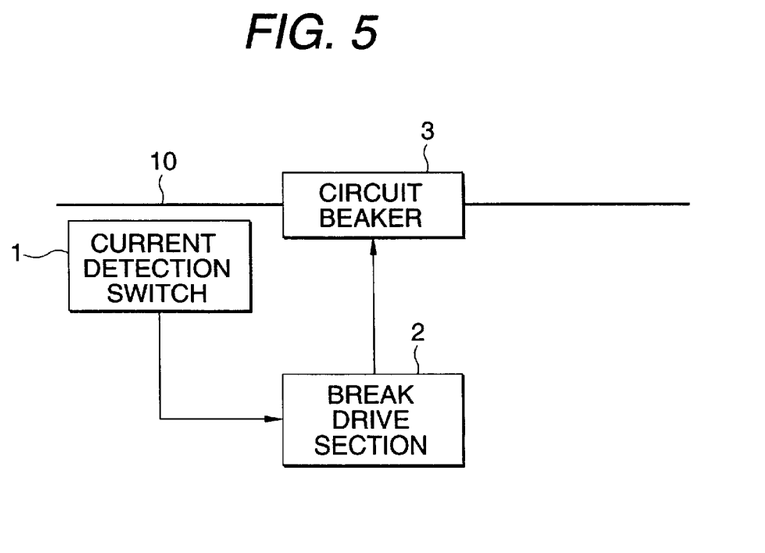
FIG. 5 is a diagram to show the schematic configuration of a circuit breaking apparatus according to a second embodiment of the invention.

FIG. 5 is a block diagram to show the configuration of a circuit breaking apparatus according to the second embodiment of the invention. The circuit breaking apparatus comprises a current detection switch 1, a break drive section 2, a circuit breaker 31 and a measured conductor 10. The described current detection switch according to the first embodiment of the invention is used as the current detection switch 1.

The current detection switch 1 is placed so that the first magnetoelectric device 11 and the second magnetoelectric device 12 sandwich the measured conductor 10 therebetween. The circuit breaker 3 is disposed at a midpoint of the measured conductor 10 and responds to a drive signal from the break drive section 2 for shutting off the measured current I flowing into the measured conductor 10. The break drive section 2 generates the drive signal based on a detection signal from the current detection switch 1 and supplies the drive signal to the circuit breaker 3.

The operation of the described circuit breaking apparatus is as follows: If the measured current I flowing into the measured conductor 10 becomes equal to or larger than a predetermined magnitude, the current detection switch 1 generates a detection signal and supplies the detection signal to the break drive section 2. The break drive section 2 generates a drive signal based on the detection signal and supplies the drive signal to the circuit breaker 3, which then shuts off the current flowing into the measured conductor 10.

The circuit breaking apparatus according to the second embodiment uses the current detection switch for detecting the current flowing into the measured conductor 10 without being affected by the disturbance magnetic flux and outputting a detection signal. Thus, for example, if an excessive current flows into a circuit, it can be reliably detected and the circuit can be shut off regardless of the presence or absence of disturbance magnetic flux.

Third embodiment

A third embodiment of the invention relates to a load failure detecting apparatus using the described current detection switch according to the first embodiment of the invention.

Figure 6:
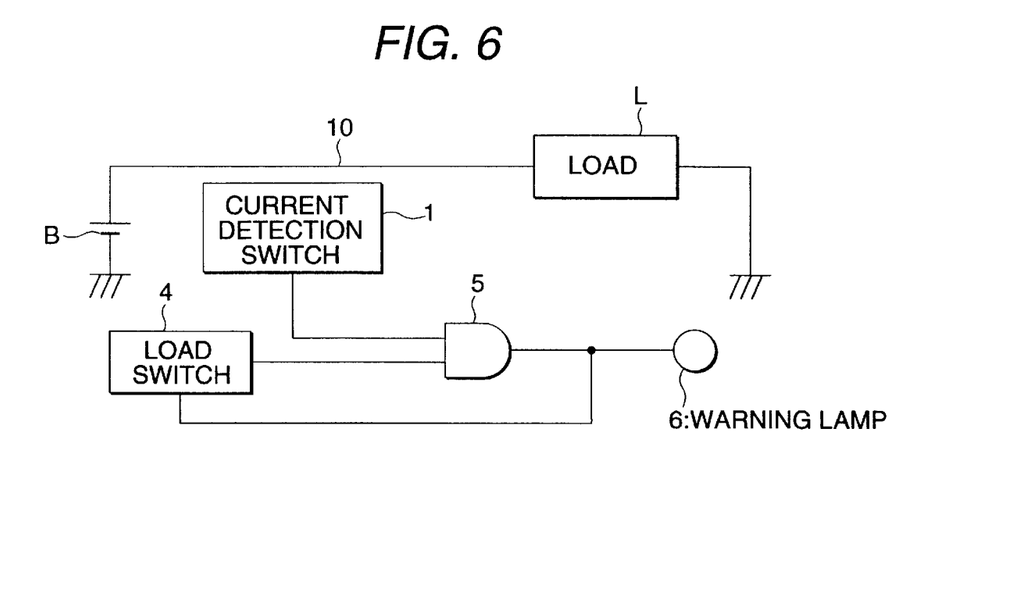
FIG. 6 is a diagram to show the schematic configuration of a load failure sensing apparatus according to a third embodiment of the invention.

FIG. 6 is a block diagram to show the configuration of a load failure detecting apparatus according to the third embodiment of the invention. The load failure detecting apparatus comprises a battery B, a load L, a current detection switch 1, a load switch 4, an AND gate 5, and a warning lamp 6. The described current detection switch according to the first embodiment of the invention is used as the current detection switch 1. However, the current detection switch 1 outputs a detection signal when the magnetic flux $\phi$ is equal to or less than the threshold value $\phi$th. To do this, a NAND gate can be used in place of the AND gate 20.

The load L is connected to the battery B. A conductor for connecting the load L and the battery B is the measured conductor 10. The current detection switch 1 is placed so that the first magnetoelectric device 11 and the second magnetoelectric device 12 sandwich the measured conductor 10 therebetween. A detection signal output from the current detection switch 1 is supplied to the AND gate 5.

The load switch 4 is used to start supplying power to the load L. A control signal (not shown) from the load switch 4 is supplied to the AND gate 5 as well as the load L. The AND gate 5 outputs the logical multiplication of the detection signal from the current detection switch 1 and the control signal output from the load switch 4 as a result signal. The result signal output from the AND gate 5 is supplied to the warning lamp 6 and the load switch 4. Turning on and off the warning lamp 6 are controlled by the signal from the AND gate 5.

The operation of the described load failure detecting apparatus is as follows: When the load switch 4 is turned on, a high control signal is supplied to the AND gate 5. A current does not flow into the conductor when a mode in which the load L does not allow a current to flow is failed or the conductor (measured conductor 10) between the battery B and the load L is broken. If no current flows into the measured conductor 10, the magnetic flux $\phi$ becomes equal to or less than the threshold value $\phi$th. Thus, the current detection switch 1 generates a high detection signal and supplies the detection signal to the AND gate 5, which then outputs a high signal.

As the AND gate 5 outputs the high signal, the warning lamp 6 is turned on. Thus, the user can know a failure of the load L or the broken conductor between the battery B and the load L. The high signal from the AND gate 5 is supplied to the load switch 4, whereby the contact of the load switch 4 is opened. Accordingly, replacement of the failing load L, etc., is facilitated.

The current detection switch according to the first embodiment of the invention can be applied to the following in addition to the apparatus shown in the first and second embodiments:

A first application example relates to a motor lock detecting apparatus using the described current detection switch according to the first embodiment of the invention.

A motor is used with a wiper or a power window of an automobile. If the power window is forcibly stopped at any position other than the normal stop position and thus the motor is locked, a large current flows as shown in FIG. 7.

Then, if the described threshold value of the current detection switch in the first embodiment is set a little lower than the magnitude of a current flowing when the motor is locked, the current detection switch outputs a detection signal when the motor is locked. Thus, current supply to the motor can be stopped in response to the detection signal.

Figure 7:
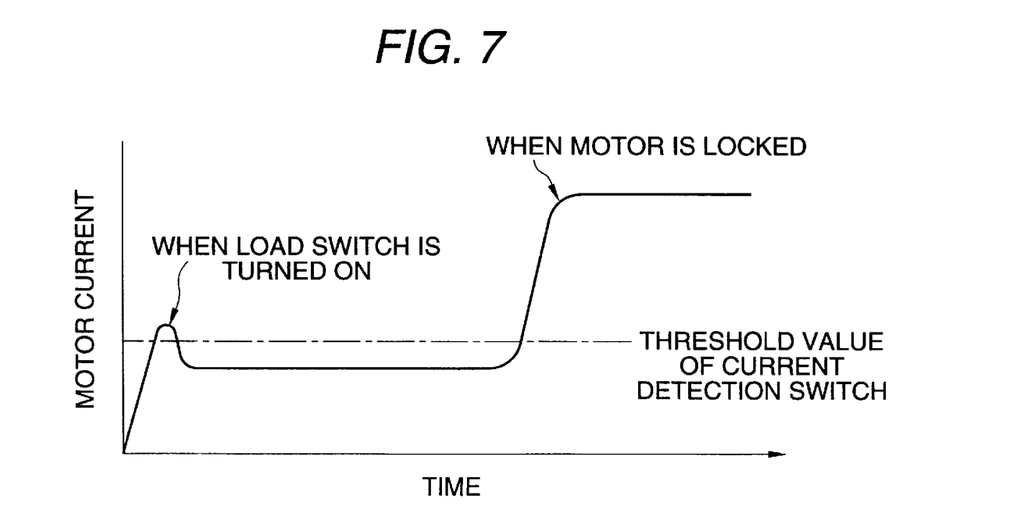
FIG. 7 is a drawing to describe a first application example of the current detection switch according to the first embodiment of the invention.

In this case, a current exceeding the threshold value may flow only for a short time because of a rush current generated by turning on a load switch, as shown in FIG. 7. In such a case, the duration of the detection signal from the current detection switch may be counted by a counter and if the count becomes equal to or greater than a given value, current supply to the motor may be stopped. According to this configuration, the motor can be stopped only when the motor is truly locked.

According to the first application example, when a foreign substance is caught in the power window and thus the motor is locked at any position other than the normal stop position, this state can be detected, so that immediately the motor can be rotated reversely for freeing the foreign substance from the power window.

For example, to attempt to move a wiper, the motor may be locked because of freezing, for example. Also in such a case, according to a similar method to that described above, the motor being locked can be detected and the motor can be stopped, so that the motor can be prevented from being burnt.

Next, a second application example will be discussed. The second application example relates to a motor number-of-revolutions detecting apparatus using the above-described current detection switch according to the first embodiment of the invention.

Figure 8:
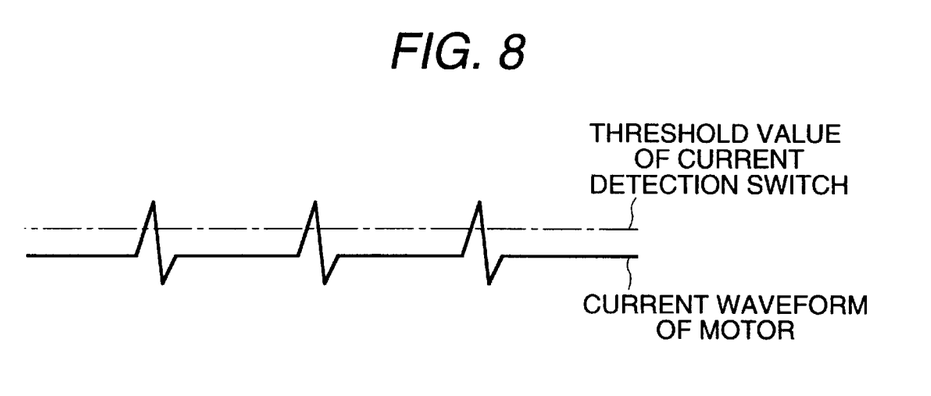
FIG. 8 is a drawing to describe a second application example of the current detection switch according to the first embodiment of the invention.

In a current supplied to a motor comprising a brush, a spike as shown in FIG. 8 occurs when the contact between the brush and a commutator is switched. Then, if the described threshold value of the current detection switch in the first embodiment is set a little lower than the magnitude of the spike, when a current exceeding the threshold value appears in the current supplied to the motor, the current detection switch outputs a detection signal. If the number of the detection signals is counted by a counter, the number of revolutions of the motor can be known.

As described above in detail, according to the invention, when the measured current is equal to or less than a certain value, the current detection switch does not react with the disturbance magnetic flux and thus can detect the current flowing into the measured conductor without being affected by the disturbance magnetic flux.

According to the invention, the computation section outputs a logical multiplication of the magnetoelectric signals from the magnetoelectric devices and an abnormal signal from the outside when a vehicle is abnormal as a detection signal, so that a detector such as a current detection switch, for example, when a circuit is dead-shorted because of a shock at the accident time and an abnormal current occurs can be configured.

According to the invention, the circuit breaking apparatus is configured using a current detection switch for detecting a current flowing into a measured conductor and outputting a detection signal without being affected by disturbance magnetic flux, and thus can shut off a circuit reliably regardless of the presence or absence of disturbance magnetic flux.

Further, according to the invention, the load failure sensing apparatus is configured using a current detection switch for detecting a current flowing into a measured conductor and outputting a detection signal without being affected by disturbance magnetic flux and thus can notify a load failure and a broken conductor regardless of the presence or absence of disturbance magnetic flux.

What is claimed is:

1. A current detection switch comprising:
    a measured conductor into which a measured current flows;
    a plurality of magnetoelectric devices placed sandwiching the measured conductor so as to have magneto-sensitive faces on sides to which a magnetic flux generated by the measured current is input, each of the magnetoelectric devices for outputting a magnetoelectric signal when the magnetic flux exceeds a predetermined value; and
    a computation section for outputting a logical multiplication of the magnetoelectric signals from the plurality of magnetoelectric devices as a detection signal.

2. The current detection switch according to claim 1, wherein the computation section outputs the logical multiplication of the magnetoelectric signals from the plurality of magnetoelectric devices and an abnormal signal from an outside when a vehicle is abnormal as the detection signal.

3. A circuit breaking apparatus comprising:
    a current detection switch including,
        a measured conductor into which a measured current flows,
        a plurality of magnetoelectric devices placed sandwiching the measured conductor so as to have magneto-sensitive faces on sides to which a magnetic flux generated by the measured current flowing into the measured conductor is input, each of the magnetoelectric devices for outputting a magnetoelectric signal when the magnetic flux exceeds a predetermined value, and
        a computation section for outputting a logical multiplication of the magnetoelectric signals from the plurality of magnetoelectric devices as a detection signal.
    a circuit breaker for shutting off the current flowing into the measured conductor; and
    a break drive section for causing the circuit breaker to shut off the current flowing into the measured conductor in response to the detection signal from the current detection switch.

4. A load failure detecting apparatus comprising:
    a current detection switch including,
        a measured conductor into which a measured current flows, the measured conductor being connecting a power supply to a load,
        a plurality of magnetoelectric devices placed sandwiching the measured conductor so as to have magneto-sensitive faces on sides to which a magnetic flux generated by the measured current flowing into the measured conductor is input, each of the magnetoelectric devices for outputting a magnetoelectric signal when the magnetic flux exceeds a predetermined value, and
        a computation section for outputting a logical multiplication of the magnetoelectric signals from the plurality of magnetoelectric devices as a detection signal;
    a load switch for supplying a current from the power supply to the load; and
    a warning device for generating a warning when the detection signal is not output from the current detection switch with the load switch turned on.

* * * * *